United States Patent
Spencer et al.

(10) Patent No.: US 8,938,896 B2
(45) Date of Patent: Jan. 27, 2015

(54) PIVOTING FASTENER COVER

(71) Applicant: Cruiser Accessories, LLC, Monument, CO (US)

(72) Inventors: Todd Spencer, Colorado Springs, CO (US); Bret Zelenka, Colorado Springs, CO (US); Eldon Goates, Colorado Springs, CO (US)

(73) Assignee: Cruiser Accessories, LLC, Monument, CO (US)

( * ) Notice: Subject to any disclaimer, the term of this patent is extended or adjusted under 35 U.S.C. 154(b) by 0 days.

(21) Appl. No.: 13/915,003

(22) Filed: Jun. 11, 2013

(65) Prior Publication Data
US 2013/0302108 A1 Nov. 14, 2013

Related U.S. Application Data

(63) Continuation-in-part of application No. 13/374,266, filed on Dec. 19, 2011, now Pat. No. 8,650,780.

(51) Int. Cl.
*G09F 7/00* (2006.01)
*A47G 3/00* (2006.01)
*B60R 11/00* (2006.01)
*B60R 13/10* (2006.01)
*F16B 37/14* (2006.01)

(52) U.S. Cl.
CPC . *A47G 3/00* (2013.01); *B60R 11/00* (2013.01); *B60R 13/105* (2013.01); *F16B 37/14* (2013.01)
USPC .................. 40/209; 40/210; 40/798

(58) Field of Classification Search
CPC ... E05B 17/185; E05B 17/002; E05B 17/183; E05B 17/181; B60R 13/105; G09F 7/18; G09F 21/04; G09F 2007/1895
USPC ......... 40/200, 201, 209, 798, 799; 411/372.6, 411/349, 373, 374, 429; 70/232, 455
See application file for complete search history.

(56) References Cited

U.S. PATENT DOCUMENTS

| | | |
|---|---|---|
| 98,733 A | 1/1870 | Barker |
| 2,095,507 A | 10/1937 | Meadows |
| 2,201,519 A | 5/1940 | Buehner |
| 2,201,930 A | 5/1940 | Stark |
| 2,275,073 A | 3/1942 | Beuhner |
| 2,355,300 A | 8/1944 | Johnstone |
| 5,027,537 A | 7/1991 | Freeman |
| D348,425 S | 7/1994 | Leu |
| 5,718,137 A | 2/1998 | Huston |
| 5,979,339 A | 11/1999 | Smith |
| D492,633 S | 7/2004 | Wales |
| D531,558 S | 11/2006 | Peng |
| D609,082 S | 2/2010 | Camisasca et al. |
| 2005/0045021 A1 | 3/2005 | Berger |
| 2006/0075665 A1 | 4/2006 | Lee et al. |
| 2007/0289176 A1 | 12/2007 | Anderson |

*Primary Examiner* — Casandra Davis
(74) *Attorney, Agent, or Firm* — Linda Flewellen Gould

(57) ABSTRACT

A specialized fastener cover is suitable for attaching to a fastener used to attach one object to another. The fastener cover includes a decorative faceplate and a method of pivoting the faceplate between two positions. In one position, the fastener can be inserted into the two objects to hold the objects together, or can be removed from the objects to release them from each other. When the faceplate is pivoted to the second position, the decorative faceplate conceals the fastener. The fastener cover can be used to cover fasteners attaching a variety of objects to each other.

12 Claims, 10 Drawing Sheets

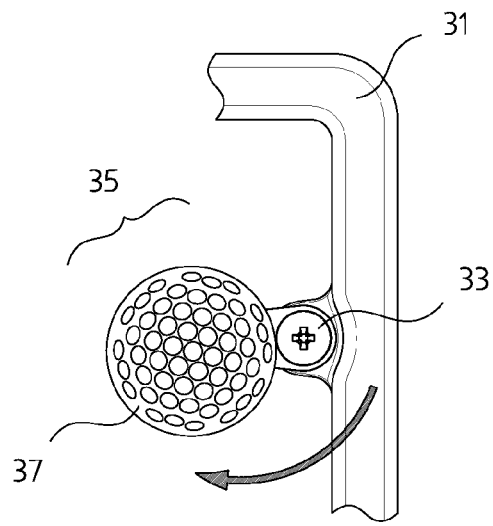
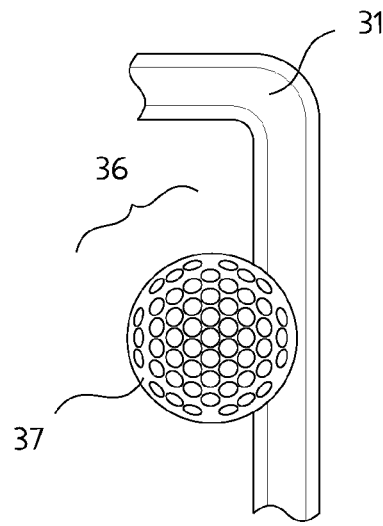
Figure 5
Figure 6
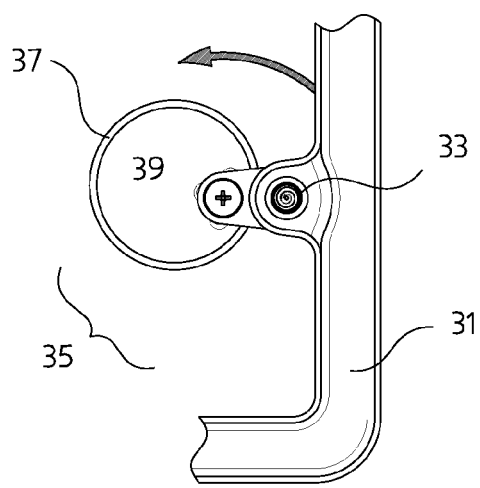
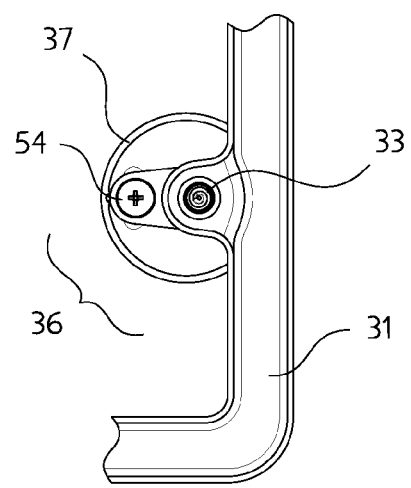
Figure 7
Figure 8

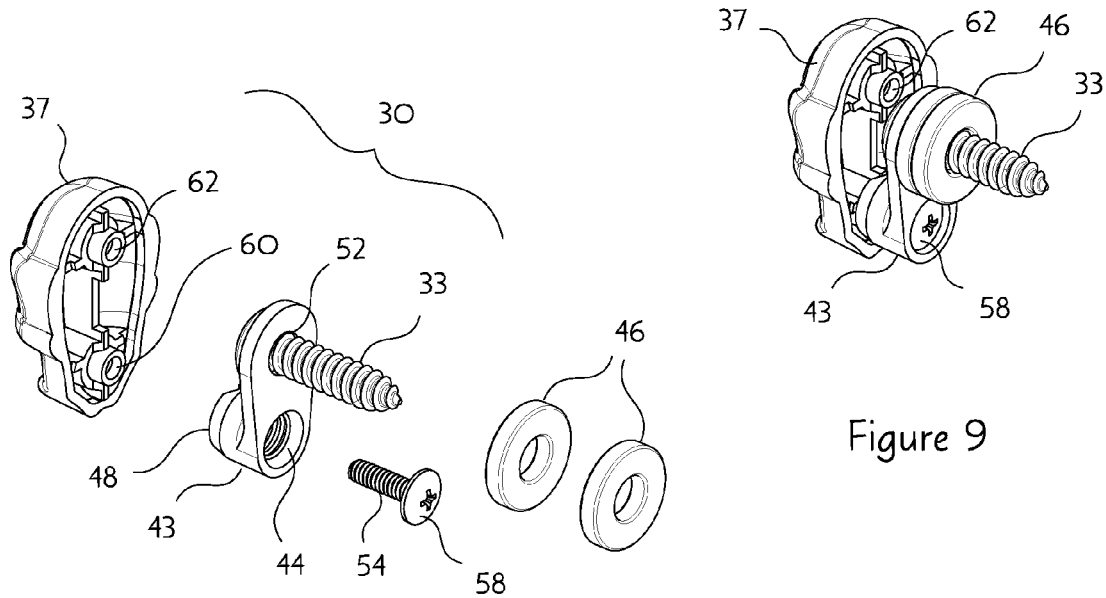
Figure 10
Figure 9
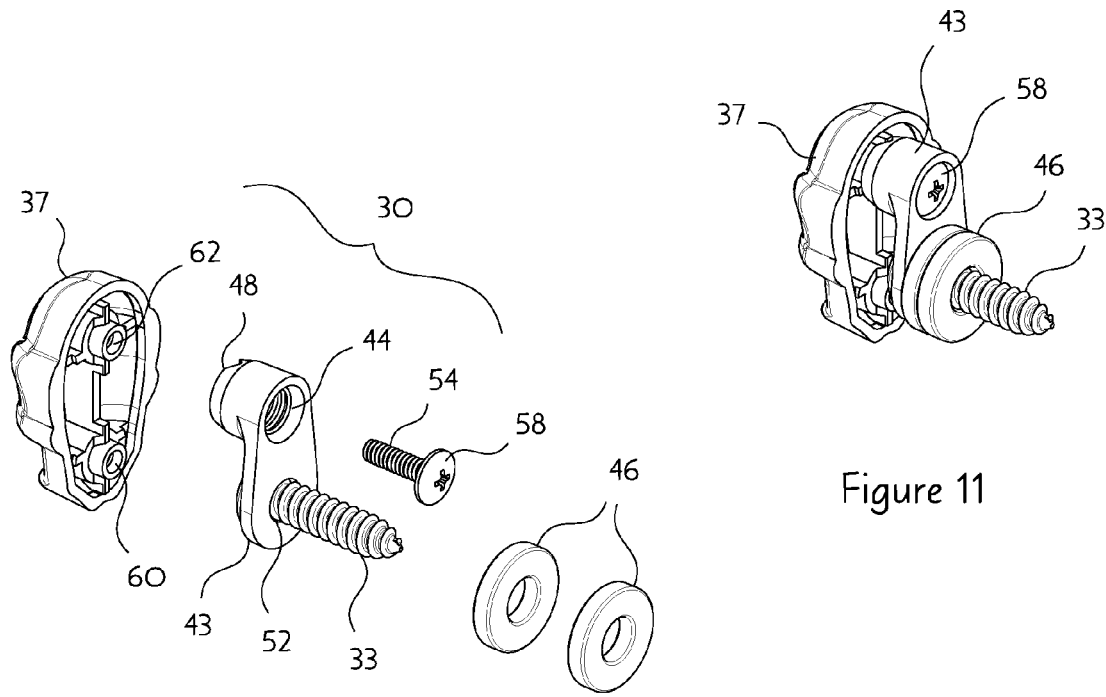
Figure 12
Figure 11

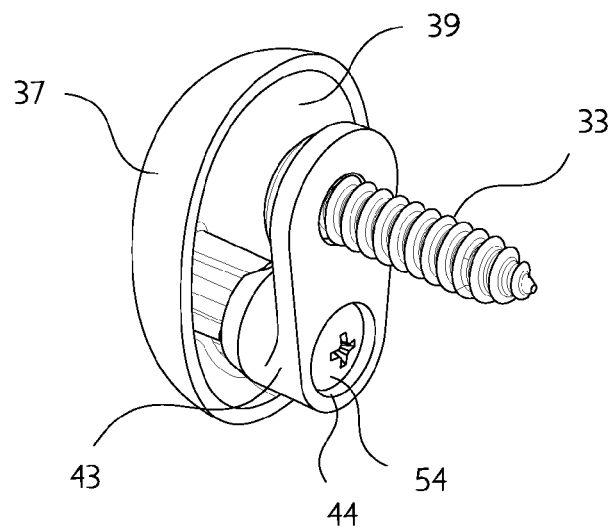
Figure 22
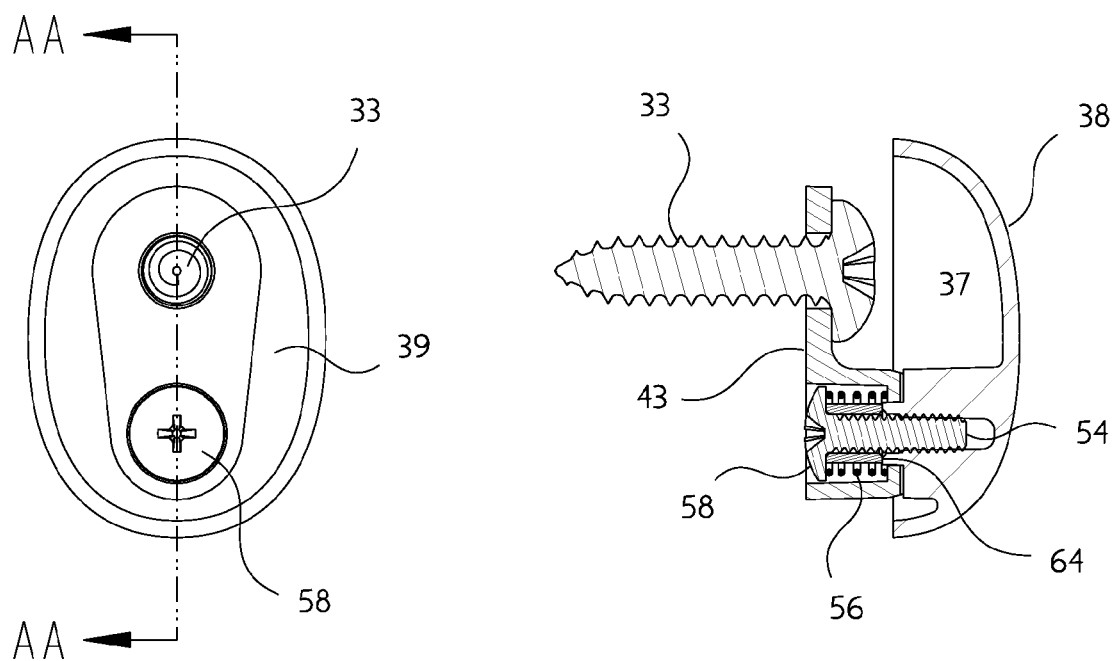
Figure 23
Figure 24
Section AA-AA ing fastener cover, a license plate frame to be
PIVOTING FASTENER COVER

CROSS-REFERENCE TO RELATED APPLICATIONS

This is a continuation-in-part (CIP) patent application of U.S. patent application Ser. No. 13/374,266, titled "License Plate Frame Pivoting Fastener Cover," filed on Dec. 19, 2011, pending. The contents of application Ser. No. 13/374,266 are incorporated herein by reference for all purposes as if fully set forth herein.

BACKGROUND OF THE INVENTION

1. Field of the Invention

The present invention relates to a pivoting fastener cover which cover is movable between two positions, one of which positions conceals a fastener and the other of which positions allows access to the fastener.

2. Description of the Prior Art

Several different types of fasteners, including nails, screws, rivets, and brads, may be used to attach one object to another. Typically such fasteners are not aesthetically pleasing, so covers may be used to conceal the head of a fastener once it is in place. A variety of different fastener covers are well known, including screw covers for screws holding together components of electrical devices, wood plugs for concealing fasteners holding together parts of wood furniture, metal plates used to cover multiple screws holding together components of equipment as diverse as computers and lawnmowers, and covers for fasteners holding together automobile components.

Fastener covers may add a decorative element to the object to which they are attached. A fastener cover may be a two dimensional design or a three dimensional ornament. For example, two or three dimensional decorations may be arranged at various locations around a picture frame by incorporating those decorations in fastener covers which conceal the fasteners holding a picture in the frame.

In some applications, limited space for aesthetic elements may be effectively expanded by using the fastener cover itself as an area of artistic expression. Using a fastener cover as additional area in which to display aesthetic elements is particularly useful in the context of license plate frames surrounding a vehicle license plate because such frames are limited in size and shape by several considerations. License plate frames cannot extend outward from the license plate into space occupied by the bumper or other components of the vehicle and cannot extend inward in a manner which would obscure visibility of numbers, letters, or renewal tags legally required to be displayed on the license plate. To provide maximum artistic expression for such license plate frames, it is desirable to utilize all of the frame area, including the areas in which a fastener is inserted to hold the frame in place on the vehicle.

However, placing a cover over a fastener has the detrimental effect of making it difficult to access the fastener, limiting opportunities to remove or loosen the fastener to take the objects apart or create some space between the objects. It is useful to allow the fastener cover to be moved out of the way to access the fastener itself, while providing a temporary position for the fastener cover while it is still attached to the object, so that the fastener cover is not easily lost.

It is also useful to provide a fastener cover which can be flexibly installed in multiple different objects and multiple possible locations on an object. Similarly, it is beneficial for the fastener cover to be movable among multiple possible locations with respect to a fastener being concealed, allowing the decorative cover to be moved higher, lower, right, and left with respect to the center of the fastener.

Although decorative fastener covers are well known, a particularly useful cover would be aesthetically pleasing, provide additional space for artistic elements, remain attached while permitting easy access to the fastener, allow flexibility in determining the position of the cover with respect to the fastener, and be useful for a variety of different objects.

SUMMARY AND OBJECTS OF THE INVENTION

A primary object of the present invention is to provide a pivoting fastener cover which can be easily moved between two positions, one of which positions allows a fastener to be accessed for insertion or removal and the second of which positions allows the cover to conceal the unattractive fastener.

Another object of the present invention is to provide a fastener cover which is not easily detachable, permitting a fastener to be inserted or removed but restricting removability of the fastener cover itself, to minimize the possibility of theft or accidental loss.

Yet another object of the present invention is to provide such a fastener cover which adds aesthetic appeal and maximizes the area in which artistic elements can be displayed.

Yet another object of the present invention is to accomplish the above objects with a fastener cover that can be used in a variety of contexts and with multiple different objects.

Yet another object of the present invention is to provide such a fastener cover which can be flexibly installed in multiple possible locations on an object or with multiple possible positions relative to the fastener.

These objects are achieved by a specialized pivoting fastener cover. The pivoting fastener cover is designed to be attached to a first object which is to be attached to a second object. For example, the pivoting fastener cover could be attached to a shelf bracket to be attached to a wall, a face plate to be attached to a cell phone, a license plate frame to be attached to a vehicle, or any number of objects being connected by a common fastener. In any context in which it is desirable to create a decorative or aesthetically pleasing result, it may be advantageous to provide a method of covering one or more fasteners used to connect multiple objects, while allowing each fastener cover to be pivoted or otherwise moved away to access the fastener.

The pivoting fastener cover of the present invention is particularly useful when incorporated into a vehicle license plate frame. Because of legal and physical restrictions, license plate frames have a limited area in which to express an artistic design or message. The overall design of the frame must fit within physical attributes of the vehicle, avoiding features such as tail lights and bumpers, while providing an unrestricted view of legally required indicia on the license plate surrounded by the frame. The screws or other fasteners utilized to attach the license plate frame to the vehicle typically detract from the overall artistic presentation of the frame, and limit the area in which that design can be displayed. Typical snap-on fastener covers are available, but such covers are easily lost when the cover is purposely removed to access the fastener for tightening or when motion of the vehicle jostles the frame. Such fastener covers are also easily damaged by tools used to remove the covers to expose the fastener.

Throughout this specification, the term "fastener" is used to refer to any of a number of possible devices for connecting objects, which fastener has a head from which extends a substantially straight rod, typically pointed or tapered. Examples of a conventional fastener include a screw, nail, brad, rivet, or pin.

The pivoting fastener cover of the present invention includes a faceplate and a specialized pivoting mechanism. The pivoting mechanism allows the faceplate to pivot from a first position exposing the aligned connection points of multiple connectable objects at which point a fastener is inserted to connect the objects, to a second position in which the aligned connection points and any fastener inserted at that point are obscured from view when observed along the axis of the fastener.

The faceplate is typically chosen for aesthetic reasons, adding to the decorative effect of the objects being attached to each other. The faceplate may be substantially two dimensional or three dimensional. The obverse face or side of the faceplate may be shaped and decorated in an infinite number of ways, including portraying a logo for a team or company, a geographic location, or simply an artistic design. The reverse face or side of the faceplate is largely hidden to an observer of the connected objects.

The pivoting mechanism ideally consists of a bracket with two receptacles, a faceplate boss on the reverse of the faceplate suitable for receiving the point end of a screw, and a screw. A fastener may be inserted through a fastener receptacle of the bracket and into the connectable objects to secure the bracket to the first object and the first object to the second object. The other receptacle formed in the bracket is suitable for receiving the pivoting mechanism screw which is inserted through that bracket screw receptacle in a direction opposite the direction that the fastener is inserted in the bracket. Thus, the pivoting mechanism screw is inserted through the bracket screw receptacle and into the faceplate boss, connecting the bracket to the faceplate while allowing the faceplate to pivot around the screw.

The faceplate boss connected to or incorporated into the reverse of the faceplate is suitable for securely receiving the point of the pivoting mechanism screw. In this manner, tightening the screw through the bracket and into the boss effectively holds the faceplate to the pivoting mechanism. When the faceplate is pivoted away from the aligned connection points of the connectable objects, the fastener can be easily inserted through the fastener receptacle of the bracket and into the connected objects. Once the fastener is inserted to connect the objects to each other, the faceplate can simply be pivoted in front of the fastener, effectively hiding the fastener from view.

One or more protrusions may beneficially extend radially from the faceplate boss, each protrusion suitable for rotating into a detent in the faceplate face of the bracket screw receptacle, allowing the faceplate to be aligned and secured in a preferred position. The pivoting mechanism may also include a spring surrounding the screw shaft between the head of the screw and the bracket, providing a force in the direction of the screw head to lift the faceplate screw receptacle protrusion out of the detent of the bracket as the screw is loosened, to facilitate pivoting of the faceplate. In this manner, the faceplate is predisposed to cease pivoting in a particular direction when the faceplate is moved to a position in which a boss protrusion fits into a detent of the bracket screw receptacle.

The faceplate pivots in a plane which is substantially perpendicular to the pivoting mechanism screw. In a first position along the pivoting path, the bracket fastener receptacle is exposed so a fastener can be inserted or removed from multiple connectable objects, allowing the fastener to be inserted through the bracket and through the multiple objects to hold the objects together, or removed to allow the objects to be separated from each other. Once the fastener has been inserted to connect the two objects, the pivoting mechanism enables the faceplate to be moved to a second position in which the faceplate conceals the fastener, adding to the overall decorative effect of the objects. In both the first position and the second position, the faceplate is connected to the first object, eliminating the possibility of the faceplate being lost during the process of tightening the fastener or by jostling as the object is moved.

Throughout this specification, the term "pivoting" is used to refer to a motion which rotates the faceplate around the axis of the screw (from the head to the point of the screw), moving the faceplate through a plane substantially perpendicular to that axis, between two distinct positions. This pivoting motion is advantageous when compared to the possible movement of the faceplate outside of that perpendicular plane toward either end of the screw, which could result in the faceplate bumping into the first object as the faceplate is moved into a position to access the fastener.

BRIEF DESCRIPTION OF THE DRAWINGS

FIG. 5 is a front view of a portion of a frame to which a pivoting fastener cover of the present invention has been attached, with the cover pivoted to a position in which a fastener can be accessed.

FIG. 6 is a front view of the frame and pivoting fastener cover of FIG. 5, with the cover pivoted to a position obscuring the fastener.

FIG. 7 is a back view of the frame and pivoting fastener cover of FIG. 5.

FIG. 8 is a back view of the frame and pivoting fastener cover of FIG. 6.

FIG. 9 is a back perspective view of a pivoting fastener cover of the present invention, in which two bosses are provided on the back of the faceplate, either of which may be selected to be attached to a bracket by a screw, so that the selected boss, bracket, and screw create the pivoting mechanism.

FIG. 10 is a partially exploded view of the pivoting fastener cover of FIG. 9.

FIG. 11 is a back perspective view of the pivoting fastener cover of FIG. 9, in which an alternate boss has been selected to be attached to a bracket by a screw, so that the alternate boss, bracket, and screw create the pivoting mechanism.

FIG. 12 is a partially exploded view of the pivoting fastener cover of FIG. 10.

FIG. 22 is a back perspective view of a pivoting fastener cover of the present invention.

FIG. 23 is a back view of the pivoting fastener cover of FIG. 22.

FIG. 24 is a cross-section view, taken along line AA-AA of FIG. 23, of the pivoting fastener cover of FIG. 23.

Figure 1:
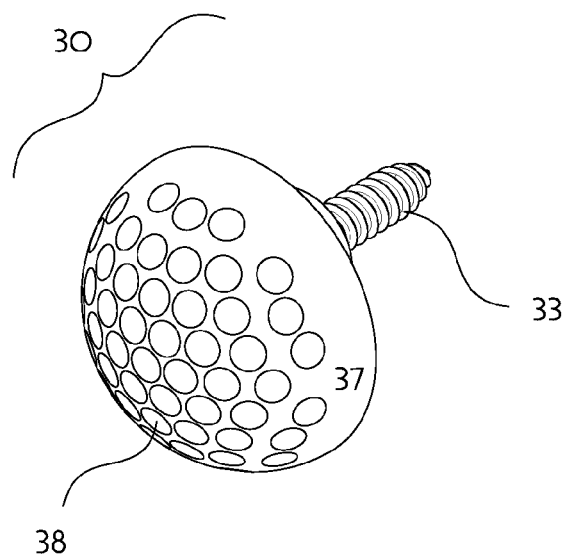
FIG. 1 is a front perspective view of a pivoting fastener cover, according to the present invention.
Figure 2:
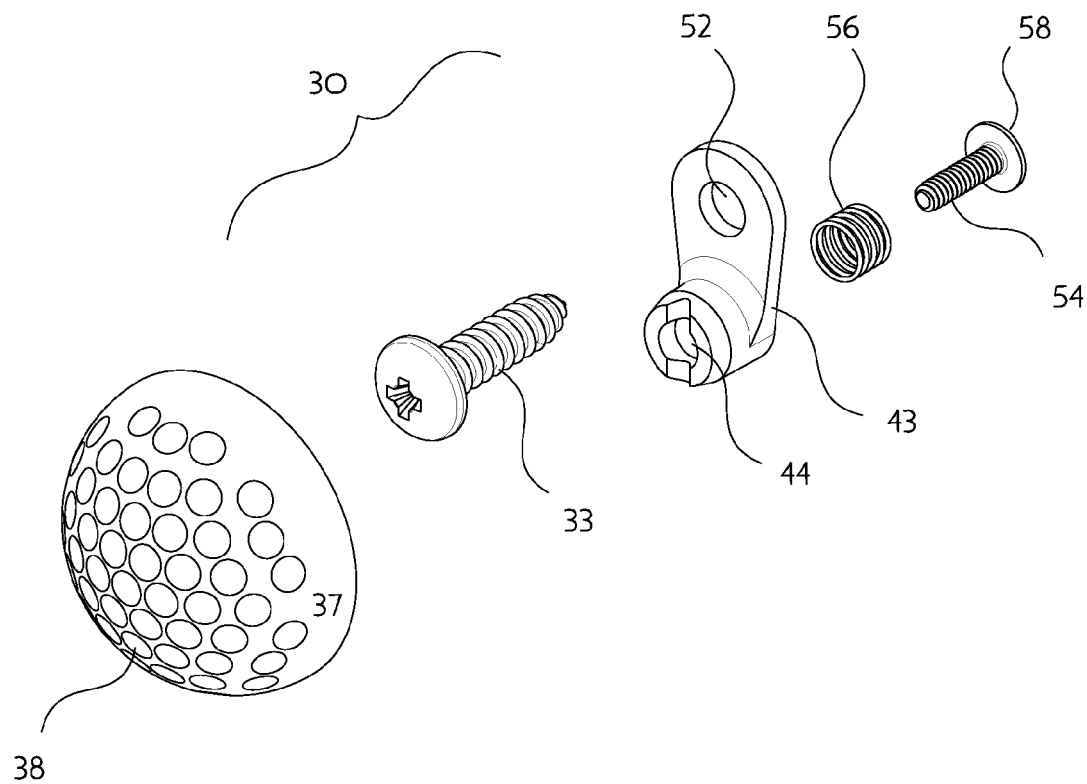
FIG. 2 is an exploded view of the pivoting fastener cover of FIG. 1.

In the drawings, the following legend has been used:
30 Pivoting Fastener Cover
31 First Object
32 Second Object to which First Object is to be attached
33 Fastener
34 Connection point to receive fastener
35 First Cover Position
36 Second Cover Position
37 Faceplate
38 Obverse of Faceplate
39 Reverse of Faceplate
40 Pivoting Mechanism
41 Faceplate boss
42 Faceplate boss protrusion
43 Bracket
44 Bracket screw receptacle
46 Washer
48 Faceplate face of bracket screw receptacle
50 Detent in faceplate face of bracket screw receptacle
52 Bracket fastener receptacle
54 Screw
56 Spring
58 Screw head
60 First of multiple bosses
62 Second of multiple bosses
64 Screw restraint

DESCRIPTION OF THE PREFERRED EMBODIMENT

The present invention concerns a specialized pivoting fastener cover which may be used to conceal a fastener connecting a first object to a second object. In the following description, numerous specific details are set forth in order to provide a thorough understanding of the present invention. It will be obvious, however, to one skilled in the art that the present invention may be practiced without these specific details. Some well-known methods and structures have not been set forth in order not to unnecessarily obscure the description of the present invention.

In many different contexts, it is desirable to attach a first object to a second object. For example, a license plate frame may be attached to a vehicle to add a decorative feature to the vehicle surrounding the state-required license plate. In this situation and many other contexts in which one object is attached to another, it may be useful to have a cover to conceal one or more fasteners by which the two objects are attached, while still allowing the fasteners to be accessed for insertion or removal.

Figure 14:
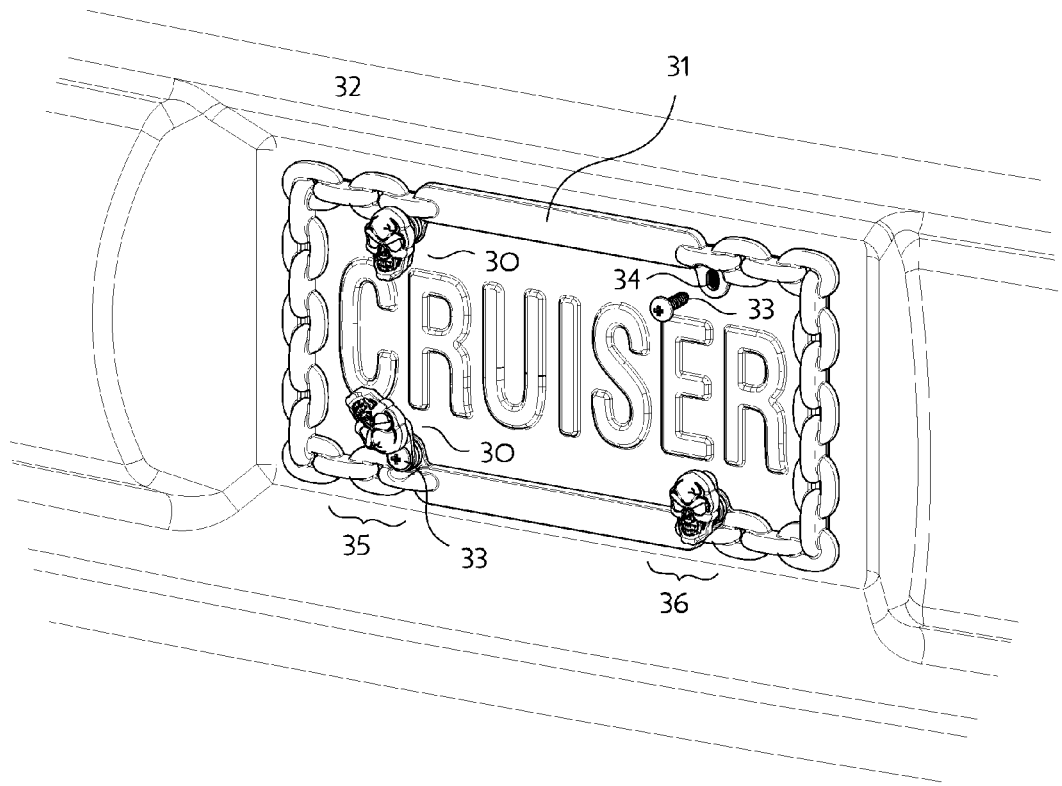
FIG. 14 is a perspective front view of a license plate frame with pivoting fastener covers attached to a vehicle.

As best shown in FIG. 14, a first object 31, such as a license plate frame, may be attached to a second object 32, such as a vehicle. A pivoting fastener cover 30 of the present invention may be attached to the first object 31 to decoratively conceal fasteners 33, such as screws, pins, nails, brads, bolts, and rivets, which are used to attach the first object 31 to the second 32.

Each pivoting fastener cover 30 includes a faceplate 37 which may be easily moved between two positions 35, 36, as shown in FIGS. 5 and 6. In each position 35, 36, the cover 30 is stably connected to the first object 31. In the first position 35 shown in FIG. 5, a fastener 33 may be easily inserted, tightened, loosened, or removed from the first object 31. The fastener 33 is beneficially inserted through aligned connection points 34 in the first object 31 and the second object 32, to connect the first object 31 to the second object 32 at the connection points 34, as best shown in FIG. 14. In some applications, holes may be drilled at each connection point 34 to guide placement of a fastener 33. Thus, when the pivoting cover 30 is in the first position 35 shown in FIGS. 5 and 7, the fastener 33 may be inserted to connect the first object 31 to the second object 32 or may be removed to disconnect the first object 31 from the second object 32.

In the second cover position 36 shown in FIGS. 6 and 8, the faceplate 37 of the fastener cover 30 conceals the fastener 33, providing a more aesthetically pleasing result. The faceplate 37 advantageously both conceals the unattractive fastener 33 and provides additional area to potentially extend and enhance an artistic design displayed on the first object 31. The fastener cover 30 remains connected to the first object 31 in both positions 35, 36, minimizing the possibility of the fastener cover 30 being lost due to theft or movement.

The faceplate 37 is ideally chosen to add a desired aesthetic effect to the first object 31. For example, the faceplate 37 may be a depiction of a golf ball, as shown in FIGS. 1-8, a depiction of a face or skull, as shown in FIGS. 9-17, a team or company logo, flowers, or any other decorative illustration. Each faceplate 37 can be either a two-dimensional or three-dimensional work of art.

Figure 3:
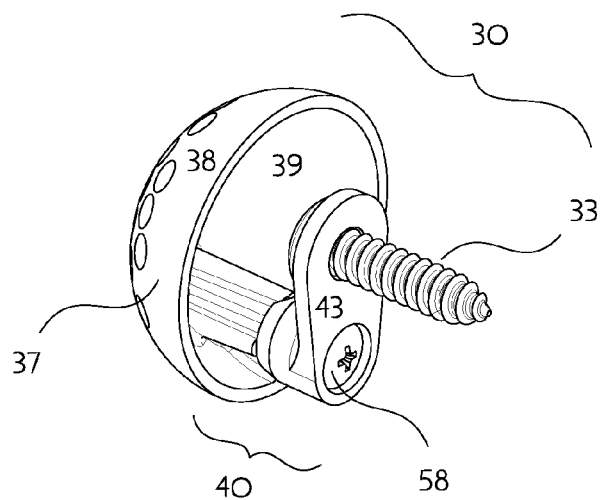
FIG. 3 is a back perspective view of a pivoting fastener cover of the present invention.
Figure 4:
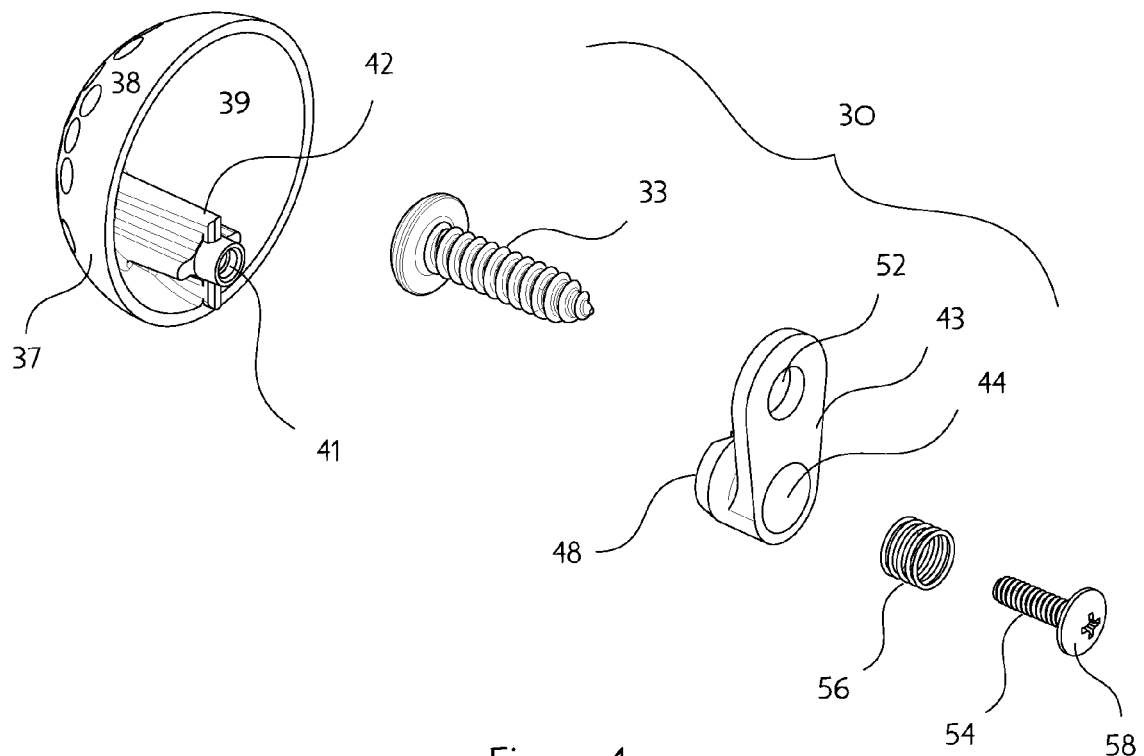
FIG. 4 is an exploded view of the pivoting fastener cover of FIG. 3.
Figure 13:
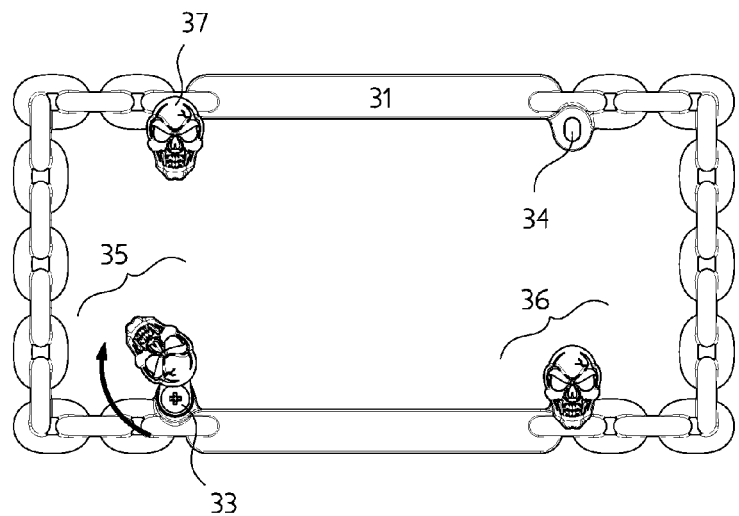
FIG. 13 is a front view of a license plate frame to which three pivoting fastener covers have been attached, two of which covers are in a position obscuring a fastener and one of which covers has been pivoted to a position in which a fastener can be accessed.

As best shown in FIGS. 3 and 4, each faceplate 37 has an obverse 38 and reverse 39. The obverse 38, being observable, is fashioned in whatever manner is most aesthetically pleasing. A pivoting mechanism 40 includes a screw 54, a specialized bracket 43, and one or more bosses 41 formed in or attached to the reverse 39 of the faceplate 37. When the screw 54 is inserted through a bracket screw receptacle 44 of the bracket 43 and into a boss 41 attached to or incorporated into the reverse 39 of the faceplate 37, the faceplate 37 may be pivoted around the screw 54, in a plane perpendicular to the axis formed by the long direction of the screw 54, as shown in FIGS. 5-8.

Figure 15:
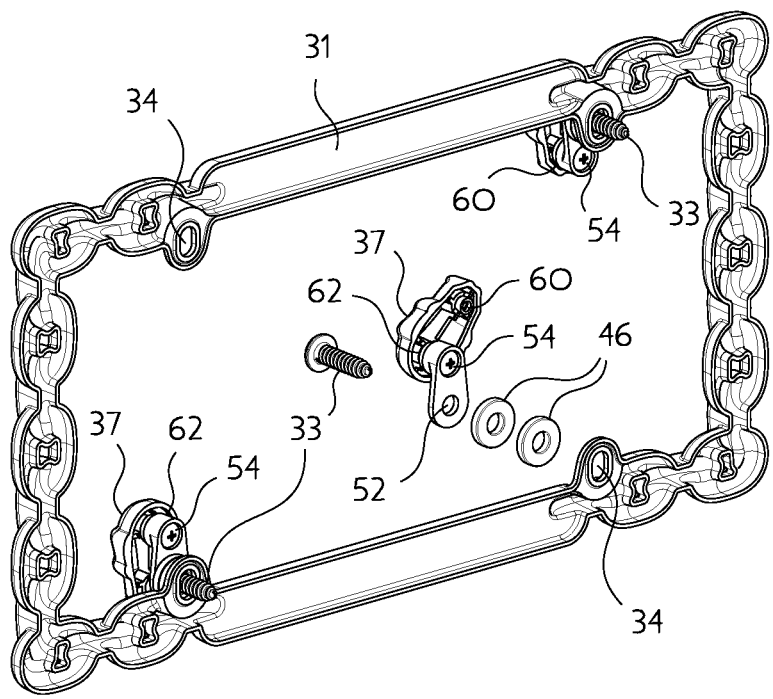
FIG. 15 is a perspective back view of the license plate frame of FIG. 13, partially exploded to show the manner in which the fastener is connected to the pivoting fastener cover and a frame.
Figure 16:
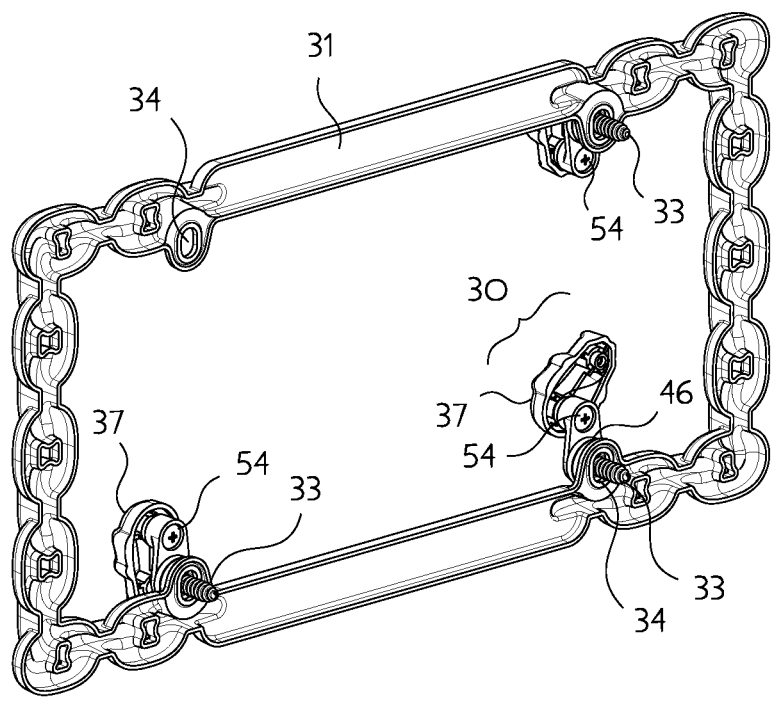
FIG. 16 is a perspective back view of the license plate frame of FIG. 13.

It is possible to provide multiple bosses 41 on the reverse 39 of a faceplate 37, as shown in FIGS. 9-12. When the pivoting mechanism 40 includes multiple bosses 60, 62, the user can choose which boss 41 to use for insertion of the screw 54. The cover 30 can be easily shifted up and down or sideways while attached to the same connection point 34 on the first object 31, by selecting one of the multiple bosses 60, 62 to receive the screw 54. For example, as shown in FIG. 15, a faceplate 37 is held in place by a screw 54 inserted in a lowermost boss 60 of that faceplate 37, when the faceplate 37 is fastened to the top bar of a license plate frame 31, allowing a fastener 33 to be inserted through the bracket fastener receptacle 52 and into the connection point 34 on that top bar while the faceplate 37 hangs beneath that top bar. Alternatively, the faceplate 37 of a different cover 30 is secured on the bottom bar of the frame 31 by inserting the screw 54 in an uppermost boss 62 of that pivoting cover 30, causing the faceplate 37 to be situated in a position relatively higher than the bottom bar of the frame 31.

The flexibility created by multiple bosses 41 may be important in contexts in which the faceplate 37 may conflict with physical features of the second object 32 or may obscure portions of the second object 32 which are desirable to be viewed. For example, when a license plate frame 31 is attached to a vehicle 32, it may be useful to provide dual bosses 60, 62, as best shown in FIGS. 10 and 12, to allow the faceplate 37 to be attached to the frame 31 in a higher or lower position on the frame 31 while maintaining a proper aesthetically pleasing orientation and still concealing the fastener 33. Attaching the faceplate 37 in this manner also provides flexibility so that the faceplate 37 may be positioned so it does not conflict with vehicle components which are located adjacent to the frame 31 on certain vehicles 32.

In the particular application shown in FIGS. 13-16, the connection points 34 available to receive a fastener 33 on the upper rung of a license plate frame 31 are positioned under that rung, making it beneficial to have the pivoting mechanism 40 connected to the faceplate 37 in a lower boss 60, arranging the bracket fastener receptacle 52 in a relatively upper location behind the faceplate 37. On the other hand, the connection points 34 of the lower rung of the license plate frame 31 are positioned above that lower rung, so it is advantageous to connect the pivoting mechanism 40 to the faceplate 37 at an upper boss 62, leaving the bracket fastener receptacle 52 in a relatively lower position behind the faceplate 37. In this manner, the same pivoting fastener cover 30 can be attached to either the upper rung or lower rung of the frame 31, in each case with the faceplate in an upright position, and in each case with the capability of being pivoted away from the connection points 34 for easy access to the fastener 33. When the pivoting mechanism 40 is attached to the lower boss 60, the faceplate 37 can be pivoted downward and away from the connection point 34. When the pivoting mechanism 40 is attached to the upper boss 62, the faceplate 37 can be pivoted upward and away from the connection point 34. In either case, the faceplate 37 is right-side-up when in the second cover position 36.

The pivoting mechanism 36 may beneficially include washers 46, as shown in FIGS. 9-12 and 15, to add height to the mounting so that the pivoting cover 30 will not interfere with the artistic elements of the object 31. Such washers 46 are completely optional.

It is also possible to provide a manner of temporarily securing the faceplate 37 in the first position 35 or the second position 36. A number of mechanisms could be used to cause the faceplate to be predisposed to stop pivoting in the first position 35 or the second position 36.

For example, as best shown in FIGS. 25, 25D, 26, and 26E, the faceplate face 48 of the bracket screw receptacle 44 may be indented with a detent or notch 50. One or more protrusions 42 around the faceplate boss 41 may slide into the detent 50 when the fastener cover 30 is pivoted to the first position 35 or the second position 36. A spring 56 surrounding the screw 54 between the bracket 43 and the boss 41 compresses as the screw 54 is tightened into the boss 41. That spring 56 provides a force that allows the protrusions 42 to engage into or be pulled out of the notches 50 as the faceplate 37 is pivoted from one position 35 or 36 to the other 36 or 35. The notches 50 are ideally located on the faceplate face 48 so as to orient the faceplate 37 in a most artistic position when a protrusion 42 rests in the notch 50.

Unlike other common fastener covers, the movement of the pivoting fastener cover 30 to expose the fastener 33 does not require the use of tools. More typical fastener covers require tools to pry off or release the fastener cover; the misuse, slipping or lack of skill in using such tools will often damage the faster cover. The simplicity of the claimed pivoting fastener cover 30 avoids that aspect for the end consumer.

As best shown in FIGS. 22 and 23, the fastener 33 is ideally inserted in a direction opposite the direction in which the screw 54 is inserted through the bracket 43 and into the faceplate boss 41. The screw 54 is parallel to the fastener 33, as the faceplate 37 pivots around the axis of the screw 54 in a plane which is perpendicular to the fastener 33 and the screw 54. It is possible, as shown in FIG. 24, to provide a restraint 64 to impede the insertion of the screw 58, stopping forward movement of the screw 54 once it is inserted in the boss 41 in an optimal position.

The specialized pivoting fastener cover 30 has a particularly useful result in the context of a license plate frame 31 suitable for attachment to a vehicle 32, as shown in FIG. 14. Such license plate frames provide an aesthetic feature to a vehicle, when attached in a position allowing a license plate to be easily viewed through the frame 31, as required by state laws. To prevent obscuring a particular portion of the license plate, a faceplate 37 attached to such a license plate frame 31 may be pivoted to a position 36 which conceals the fastener 33 but does not obscure particular information on the license plate. Space for artistic design is at a premium on the frame 31, so utilizing the area normally occupied by the fastener 33 for artistic presentation such as a decorative faceplate 37 increases the aesthetic options available in such frames. Approximately 17% more area is available for aesthetic features when the pivoting fastener cover 30 is added to the frame 31. Thus, the faceplate 37 serves the dual purposes of providing more area for design and covering the fastener 33 which otherwise detracts from overall artistic appeal.

Figure 17:
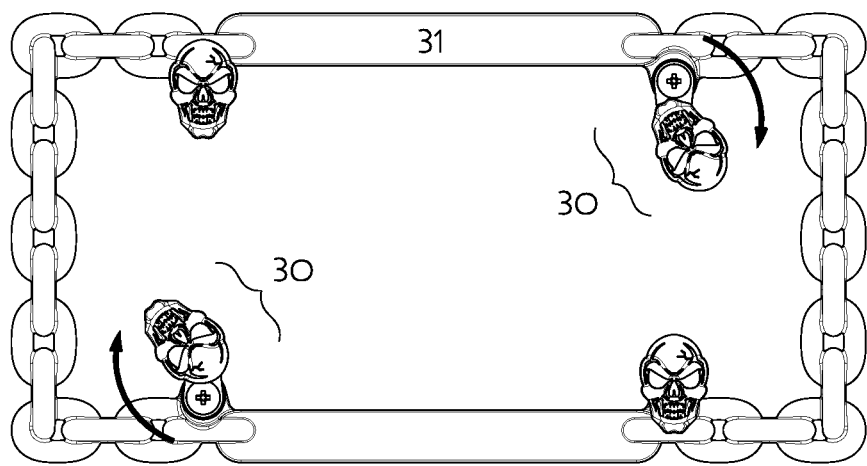
FIG. 17 is a front view of a license plate frame to which four pivoting fastener covers have been attached.
Figure 18:
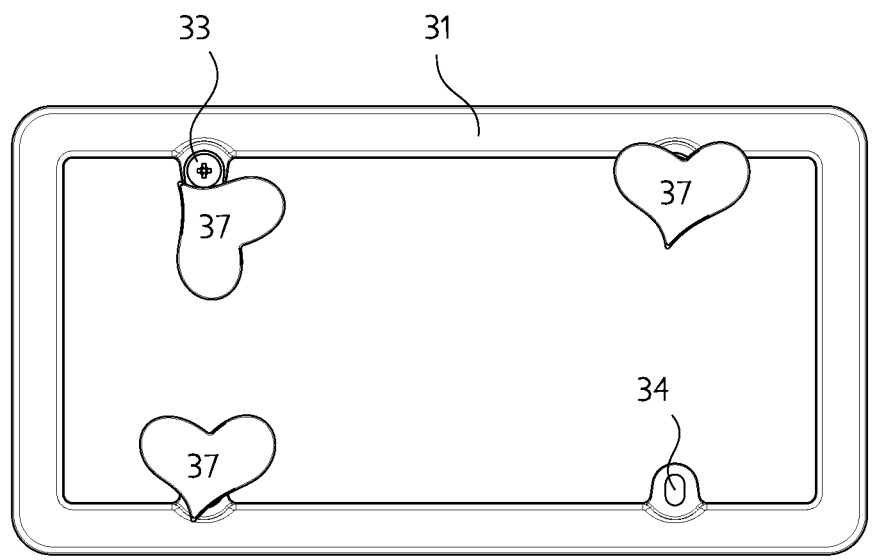
FIG. 18 is a front view of a different license plate frame to which three pivoting fastener covers have been attached.
Figure 19:
FIG. 19 is a front view of a wall plate and light switch to which a pivoting fastener cover has been attached and pivoted to obscure a fastener connecting the wall plate to a junction box.
Figure 20:
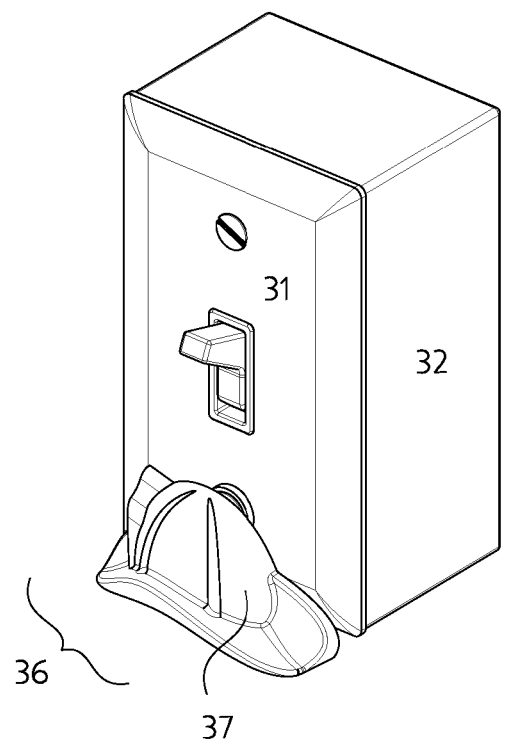
FIG. 20 is a perspective front view of the wall plate, light switch, junction box, and pivoting fastener cover of FIG. 19.
Figure 21:
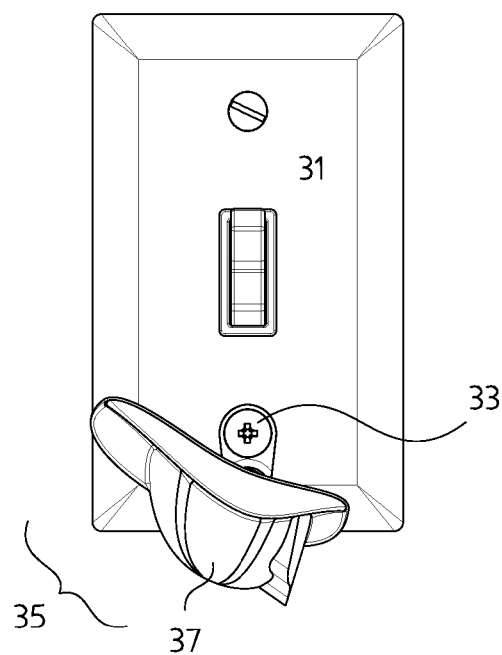
FIG. 21 is a front view of the wall plate and light switch of FIG. 19, with the pivoting fastener cover pivoted to a position in which the fastener can be seen and accessed.
Figure 25:
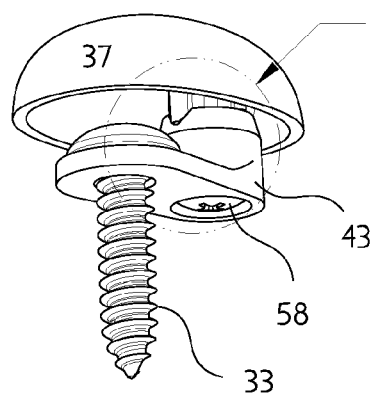
FIG. 25 is a bottom perspective view of a pivoting fastener cover of the present invention.
Figure 25D:
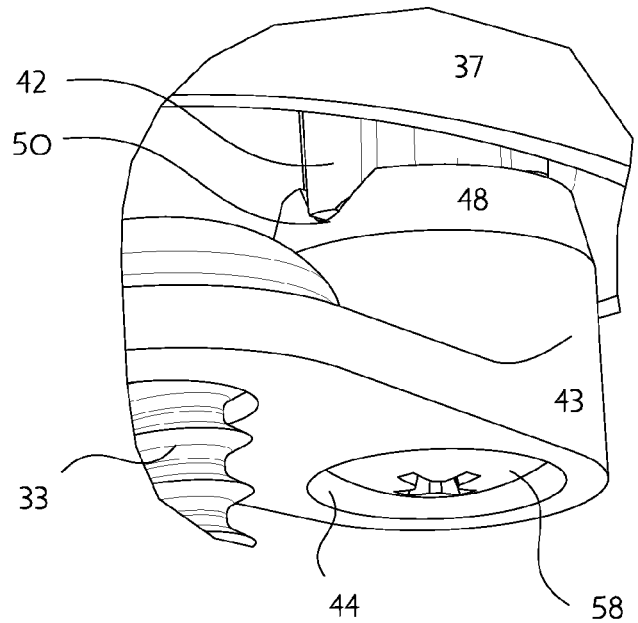
FIG. 25D is an enlarged view of a portion of FIG. 25.
Figure 26:
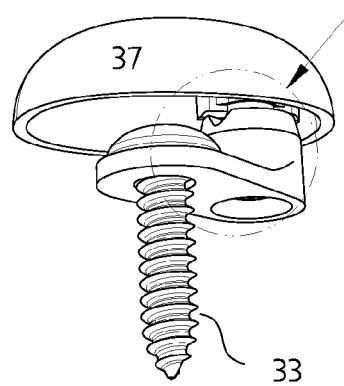
FIG. 26 is a bottom perspective view of the pivoting fastener cover of FIG. 25, wherein the cover has been pivoted to a different position than shown in FIG. 25.
Figure 26E:
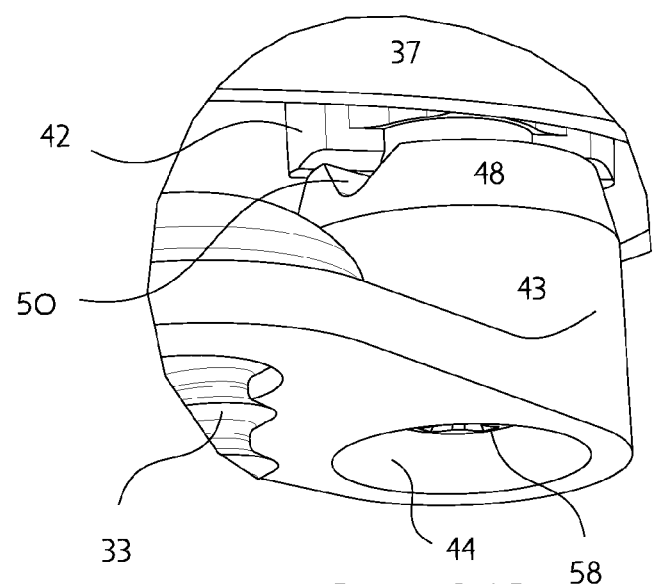
FIG. 26E is an enlarged view of a portion of FIG. 26.

The pivoting mechanism 40 is independent of the objects 31, 32 being connected by the fastener 33. Thus, the pivoting fastener cover 30 is not confined to a particular object or position on that object, but can be used in many different contexts as well as many different positions with respect to a particular object 31, as shown in FIGS. 17 and 18.

Although the present invention has been described in terms of the presently preferred embodiment, it is to be understood that such disclosure is purely illustrative and is not to be interpreted as limiting. Consequently, without departing from the spirit and scope of the invention, various alterations, modifications, or alternative applications of the invention will, no doubt, be suggested by those skilled in the art after having read the preceding disclosure. For example, instead of the screw 54, a number of commonly known fastening devices, such as a bolt, may be used. Typical methods of holding the bracket in a preferred position may also be utilized instead of the specific mechanisms described herein. Accordingly, it is intended that the following claims be interpreted as encompassing all alterations, modifications, or alternative applications as fall within the true spirit and scope of the invention.

We claim:

1. A pivoting fastener cover comprising:
   a. a fastener suitable for attaching a first object to a second object;
   b. faceplate having obverse and reverse, said faceplate movable in a plane substantially perpendicular to said fastener from a first position suitable for inserting the fastener in the first object and second object to a second position in which said faceplate conceals the fastener;
   c. pivoting means for pivoting said faceplate between said first position and said second position; and
   d. shifting means for shifting said faceplate among a plurality of positions relative to the fastener when the faceplate is in said second position;
   e. wherein the pivoting fastener cover is removably connectable to the first object by the fastener.

2. A pivoting fastener cover according to claim 1, wherein said pivoting means comprises:
   a. bracket having a screw receptacle and having a fastener receptacle through which the fastener can be inserted to connect the bracket to the first object and the first object to the second object, said fastener receptacle and said screw receptacle aligned so that a screw inserted in the screw receptacle is substantially parallel to the fastener inserted in the fastener receptacle;
   b. first faceplate boss situated on the faceplate reverse; and
   c. screw suitable for inserting through said bracket screw receptacle into said first faceplate boss to attach said faceplate to said bracket in a manner that allows said faceplate to pivot in a plane substantially perpendicular to the screw.

3. A pivoting fastener cover according to claim 2, wherein said shifting means comprises at least one alternate faceplate boss situated on the faceplate reverse for receiving said screw to attach said faceplate to said bracket.

4. A pivoting fastener cover according to claim 3, wherein said pivoting means is predisposed to stop pivoting at said first position and at said second position.

5. A pivoting fastener cover according to claim 2, wherein said pivoting means is predisposed to stop pivoting at said first position and at said second position.

6. A pivoting fastener cover according to claim 1, wherein said pivoting means is predisposed to stop pivoting at said first position and at said second position.

7. A pivoting fastener cover comprising:
   a. a fastener suitable for attaching a license plate frame to a vehicle;
   b. faceplate having obverse and reverse, said faceplate movable in a plane substantially perpendicular to said fastener from a first position suitable for inserting the fastener in the license plate frame and vehicle to a second position in which said faceplate conceals the fastener;
   c. pivoting means for pivoting said faceplate between said first position and said second position; and,
   d. shifting means for shifting said faceplate among a plurality of positions relative to the fastener when the faceplate is in said second position;
   e wherein the pivoting fastener cover is removably connectable to the license plate frame by the fastener.

8. A pivoting fastener cover according to claim 7, wherein said pivoting means comprises:
   a. bracket having a screw receptacle and having a fastener receptacle through which the fastener can be inserted to connect the bracket to the license plate frame and the license plate frame to the vehicle, said fastener receptacle and said screw receptacle aligned so that a screw inserted in the screw receptacle is substantially parallel to the fastener inserted in the fastener receptacle;
   b. first faceplate boss situated on the faceplate reverse; and
   c. screw suitable for inserting through said bracket screw receptacle into said first faceplate boss to attach said faceplate to said bracket in a manner that allows said faceplate to pivot in a plane substantially perpendicular to the screw.

9. A pivoting fastener cover according to claim 8, wherein said shifting means comprises at least one alternate faceplate boss situated on the faceplate reverse for receiving said screw to attach said faceplate to said bracket.

10. A pivoting fastener cover according to claim 9, wherein said pivoting means is predisposed to stop pivoting at said first position and at said second position.

11. A pivoting fastener cover according to claim 8, wherein said pivoting means is predisposed to stop pivoting at said first position and at said second position.

12. A pivoting fastener cover according to claim 7, wherein said pivoting means is predisposed to stop pivoting at said first position and at said second position.

* * * * *